United States Patent
Croak et al.

(10) Patent No.: US 8,711,680 B2
(45) Date of Patent: *Apr. 29, 2014

(54) METHOD AND APPARATUS FOR RE-ROUTING CALLS IN A PACKET NETWORK DURING FAILURES

(71) Applicant: AT&T Intellectual Property II, L.P., Atlanta, GA (US)

(72) Inventors: Marian Croak, Fair Haven, NJ (US); Hossein Eslambolchi, San Diego, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,406

(22) Filed: Dec. 6, 2012

(65) Prior Publication Data

US 2013/0094347 A1 Apr. 18, 2013

Related U.S. Application Data

(63) Continuation of application No. 11/089,739, filed on Mar. 25, 2005, now Pat. No. 8,355,314.

(51) Int. Cl.
G01R 31/08 (2006.01)
(52) U.S. Cl.
USPC .......................................... 370/217; 370/221
(58) Field of Classification Search
USPC .......................................... 370/261, 217, 221
See application file for complete search history.

(56) References Cited

U.S. PATENT DOCUMENTS

| 4,278,844 | A | * | 7/1981 | Jones | 379/157 |
|---|---|---|---|---|---|
| 5,515,176 | A | * | 5/1996 | Galen et al. | 358/403 |
| 6,330,323 | B1 | | 12/2001 | Gottlieb et al. | |
| 6,411,681 | B1 | | 6/2002 | Nolting et al. | |
| 6,577,718 | B1 | | 6/2003 | Kalmanek, Jr. | |
| 6,687,356 | B1 | | 2/2004 | Giltho et al. | |
| 6,754,180 | B1 | | 6/2004 | Christie | |
| 6,868,060 | B2 | | 3/2005 | Barzegar et al. | |
| 7,088,810 | B1 | | 8/2006 | Burg | |
| 7,155,528 | B2 | * | 12/2006 | Tam | 709/230 |
| 7,161,923 | B2 | | 1/2007 | Young | |
| 7,613,170 | B1 | | 11/2009 | Grabelsky et al. | |

(Continued)

FOREIGN PATENT DOCUMENTS

WO WO-01/86970 A 11/2001

OTHER PUBLICATIONS

Examiner's Report for CA 2,540,629, Dec. 7, 2009, 8 pages.
Examination Report for EP 06 111 719.8, Jul. 21, 2008, 3 pages.

(Continued)

Primary Examiner — Sai-Ming Chan

(57) ABSTRACT

Method and apparatus for re-routing a call in a packet network during failures is described. In one example, a failure condition is detected for a destination endpoint for the call. At least one alternative endpoint address is identified from an alternative routing plan registered with the packet network in response to the failure condition. For example, various alternative routing plans may be registered with the packet network and stored in a database. Each of the alternative routing plans may include alternative endpoint address data for a plurality of endpoint devices. The database may be queried using the destination endpoint as an index value and the at least one alternative endpoint address may be retrieved. The call is then routed to the at least one alternative endpoint address.

16 Claims, 4 Drawing Sheets

(56) References Cited

U.S. PATENT DOCUMENTS

| | | |
|---|---|---|
| 8,064,452 B2 | 11/2011 | Croak et al. |
| 8,355,314 B2 | 1/2013 | Croak et al. |
| 2001/0005372 A1 | 6/2001 | Cave et al. |
| 2002/0006137 A1 | 1/2002 | Rabenko et al. |
| 2002/0080751 A1 | 6/2002 | Hartmaier |
| 2002/0176557 A1 | 11/2002 | Burger |
| 2003/0007622 A1 | 1/2003 | Kalmanek et al. |
| 2003/0072270 A1* | 4/2003 | Guerin et al. ............ 370/254 |
| 2003/0076815 A1 | 4/2003 | Miller et al. |
| 2003/0185200 A1 | 10/2003 | Beyda |
| 2003/0185360 A1 | 10/2003 | Moore et al. |
| 2006/0106941 A1 | 5/2006 | Singhal et al. |
| 2006/0215543 A1 | 9/2006 | Croak et al. |
| 2006/0215830 A1 | 9/2006 | Simpson |
| 2006/0245350 A1 | 11/2006 | Shei et al. |
| 2006/0251052 A1 | 11/2006 | Croak et al. |
| 2008/0002669 A1 | 1/2008 | O'Brien et al. |
| 2009/0103526 A1 | 4/2009 | Croak et al. |
| 2009/0109959 A1 | 4/2009 | Elliot et al. |
| 2010/0098067 A1 | 4/2010 | Croak et al. |
| 2010/0226363 A1 | 9/2010 | McGuigan et al. |

OTHER PUBLICATIONS

EP Search Report Publication for EP 1705864 A1; published Sep. 27, 2006, 12 pages.

Zhu, X., et al., "IIN Model: Modifications and Case Study," Computer Networks, Elsevier Science Publishers B.V., Amsterdam, NL, vol. 35, No. 5, Apr. 2001, pp. 507-519.

Search Report for EP 06112771.8, Aug. 22, 2006, 8 pages.

Office Action for CA 2,544,114, Jan. 8, 2010, pp. 1-5.

* cited by examiner

METHOD AND APPARATUS FOR RE-ROUTING CALLS IN A PACKET NETWORK DURING FAILURES

This application is a continuation of U.S. patent application Ser. No. 11/089,739, filed Mar. 25, 2005, which is currently allowed and is herein incorporated by reference in its entirety.

BACKGROUND OF THE INVENTION

1. Field of the Invention

Embodiments of the present invention generally relate to telecommunications systems and, more particularly, to a method and apparatus for re-routing calls in a packet network during failures is described.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. Exemplary packet networks include internet protocol (IP) networks, asynchronous transfer mode (ATM) networks, frame-relay networks, and the like. An exemplary circuit-switched network includes a plain old telephone system (POTS), such as the publicly switched telephone network (PSTN).

Telephony service providers typically offer services to enterprises that access the services through nodal endpoints on the customer premises. Presently, when these nodal endpoints experience outages (i.e., when the nodal endpoints fail), calls to these endpoints are blocked. These calls are blocked regardless of the existence of alternative active endpoints for reaching the user of the failed device. Accordingly, there exists a need in the art for a method and apparatus that re-routes calls in a packet network during failures.

SUMMARY OF THE INVENTION

Method and apparatus for re-routing a call in a packet network during failures is described. In one embodiment, a failure condition is detected for a destination endpoint for the call. At least one alternative endpoint address is identified from an alternative routing plan registered with the packet network in response to the failure condition. For example, various alternative routing plans may be registered with the packet network and stored in a database. Each of the alternative routing plans may include alternative endpoint address data for a plurality of endpoint devices. The database may be queried using the destination endpoint as an index value and the at least one alternative endpoint address may be retrieved. The call is then routed to the at least one alternative endpoint address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
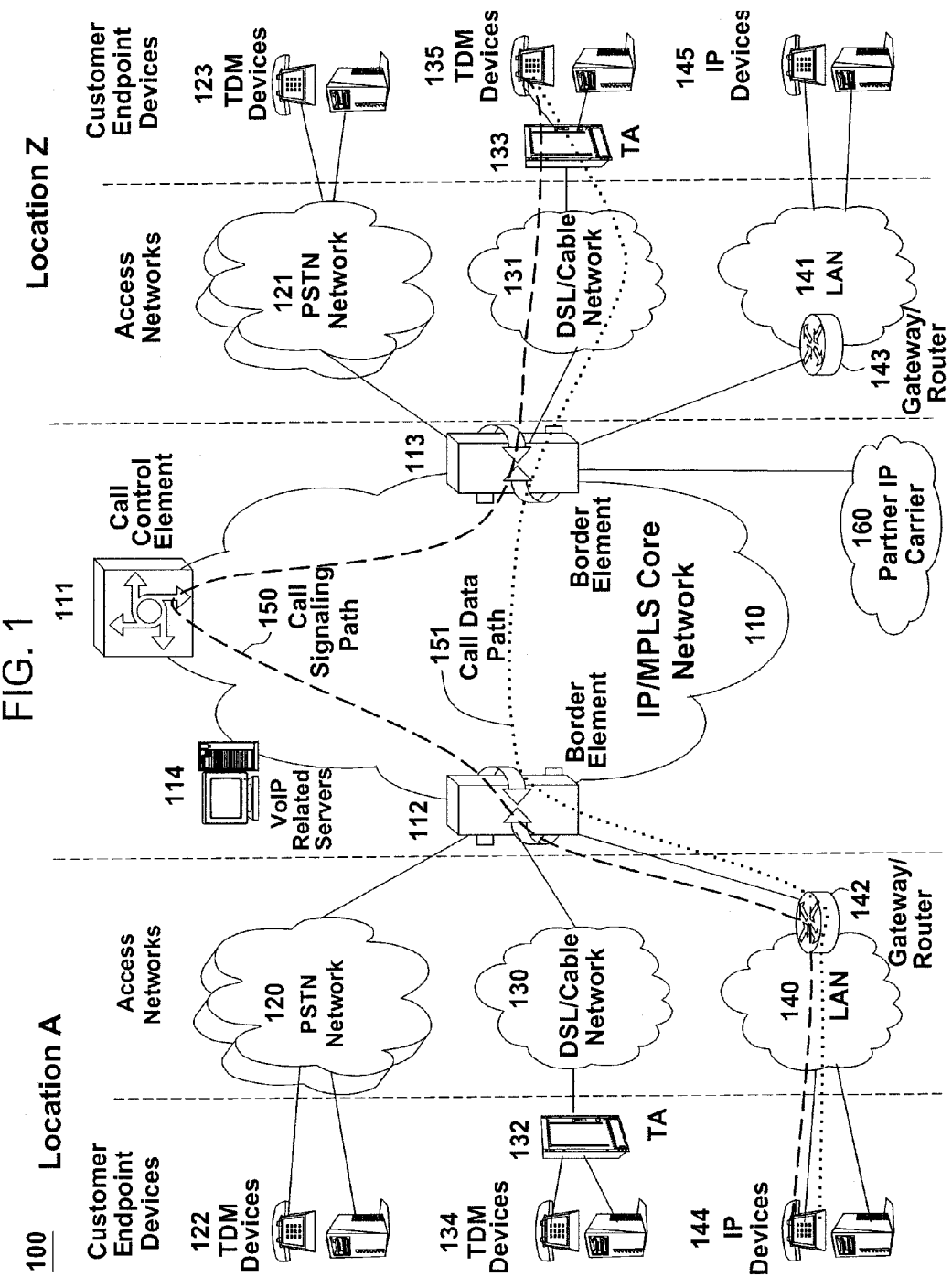
FIG. 1 is a block diagram depicting an exemplary embodiment of a communication system in accordance with the invention.

To better understand the present invention, FIG. 1 illustrates an example network, e.g., a packet network such as a voice-over-internet protocol (VoIP) network related to the present invention. Exemplary packet networks include Internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. BEs may also be referred to as "edge components." A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
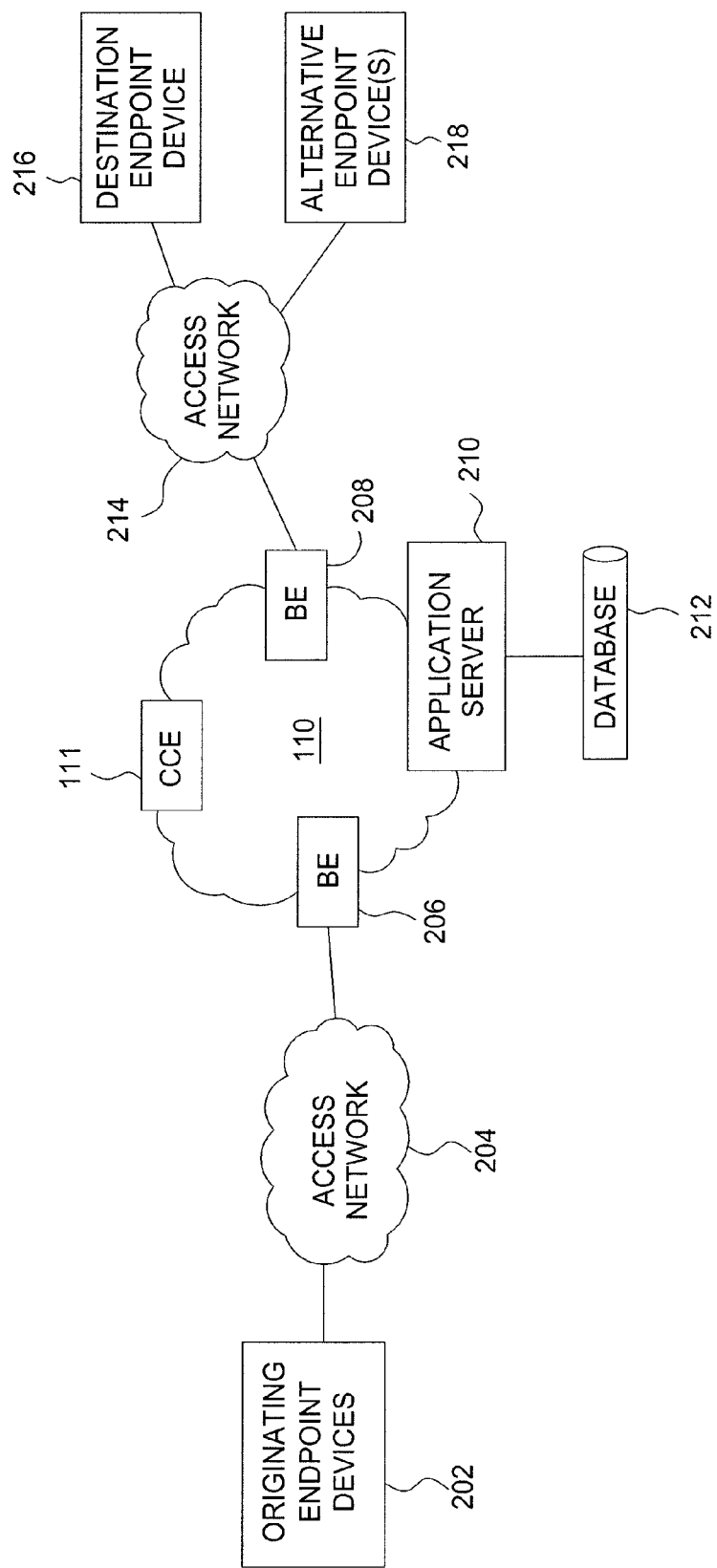
FIG. 2 is a block diagram depicting an exemplary configuration of the communication system of FIG. 1 in accordance with the invention.

FIG. 2 is a block diagram depicting an exemplary configuration of the communication system of FIG. 1 in accordance with the invention. In the present embodiment, an endpoint device 202 is in communication with the core network 110 through an access network 204 and a border element 206. Endpoint devices 216 and 218 are in communication with the core network 110 through an access network 214 and a border element 208. The originating endpoint devices 202 and the terminating endpoint devices 208 may comprise any of the customer endpoint devices described above (e.g., TDM devices, IP devices, etc.). The access networks 204 and 214 may comprise any of the access networks described above (e.g., PSTN, DSL/Cable, LAN, etc). In the present example, the endpoint device 202 attempts to establish a call to the endpoint device 216. Thus, the endpoint device 202 is referred to as the originating endpoint device, and the endpoint device 216 is referred to as the destination endpoint device.

For each call requested by the originating device 202, the call setup process described above is performed. In the present example, assume that the destination endpoint device 216 has failed (e.g., the destination endpoint device 216 has ceased to function, has lost power, or is otherwise unable to perform its intended function). The call setup message transmitted by the BE 208 towards the destination endpoint device 216 is not acknowledged due to the failure. As such, a failure condition is detected for the destination endpoint device 216. The failure condition may be detected by the BE 208, the CCE 111, or both (referred to as the "detecting network element").

The destination endpoint device 216 may be unavailable for other reasons than a failure. For example, the destination endpoint device 216 may be unavailable to receive the call due to a busy condition or a no answer condition. However, the detecting network element is configured to determine whether the unavailability of the destination endpoint device 216 is due to a failure condition or a busy/no answer condition. For example, the destination endpoint device 216 may respond to the call setup message with a message indicative of the busy/no answer condition, which is received by the detecting network element. In contrast, if the destination endpoint device 216 has failed, no such busy/no answer message is received, which is indicative of a failure condition. In this manner, the detecting network element is configured to distinguish between a busy/no answer condition and a failure condition.

Having detected a failure condition for the destination endpoint device 216, the detecting network element informs an application server 210. The application server 210 is coupled to a database 212. The database 212 is configured to store various alternative routing plans for different endpoint devices. Each alternative routing plan may comprise alternative endpoint address data for each of a plurality of endpoint devices. For example, an enterprise may register an alternative routing plan with the network for its endpoint devices. The application server 210 queries the database 212 using the destination endpoint address as an index value to identify at least one alternative endpoint address for the endpoint device(s) 218 ("alternative endpoint device(s)"). The application server 210 then forwards the alternative endpoint address data to the detecting network element. The detecting network element then re-routes the call to one or more of the alternative endpoint device(s). In this manner, when the destination endpoint device 216 has failed, calls to the device are re-routed to alternative device(s) instead of being blocked.

Figure 3:
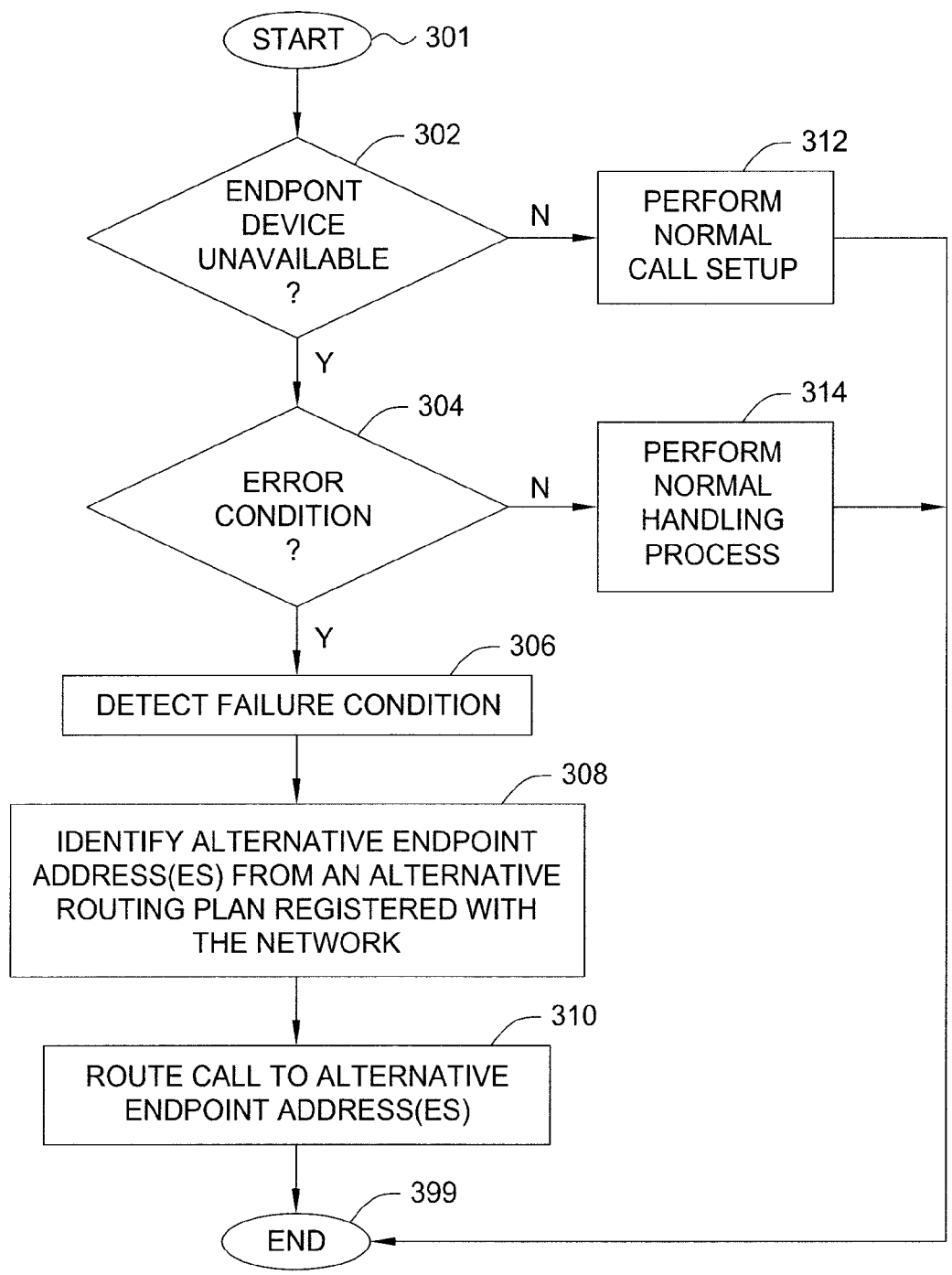
FIG. 3 is a flow diagram depicting an exemplary embodiment of a method for routing a call in a packet network in accordance with one or more aspects of the invention.

FIG. 3 is a flow diagram depicting an exemplary embodiment of a method 300 for routing a call in a packet network in accordance with one or more aspects of the invention. The method 300 begins at step 301. At step 302, a determination is made whether the destination endpoint for the call is unavailable. If not, the method 300 proceeds to step 312, where the normal call setup process is performed. The method then ends at step 399. Otherwise, the method 300 proceeds to step 304. At step 304, a determination is made whether the unavailability of the destination endpoint is due to an error condition. If not, the method 300 proceeds to step 314, where the normal process for handling a busy/no answer condition is performed (e.g., a busy signal is returned to the originating device in response to a busy condition, a no answer message is returned to the origination device in response to a no answer condition). The method 300 then ends at step 399. Otherwise, the method 300 proceeds to step 306.

At step 306, a failure condition for the destination endpoint is deemed to be detected. At step 308, at least one alternative endpoint address is identified from an alternative routing plan registered with the packet network in response to the failure condition. At step 310, the call is routed to the at least one alternative endpoint address. The method 300 then ends at step 399.

Figure 4:
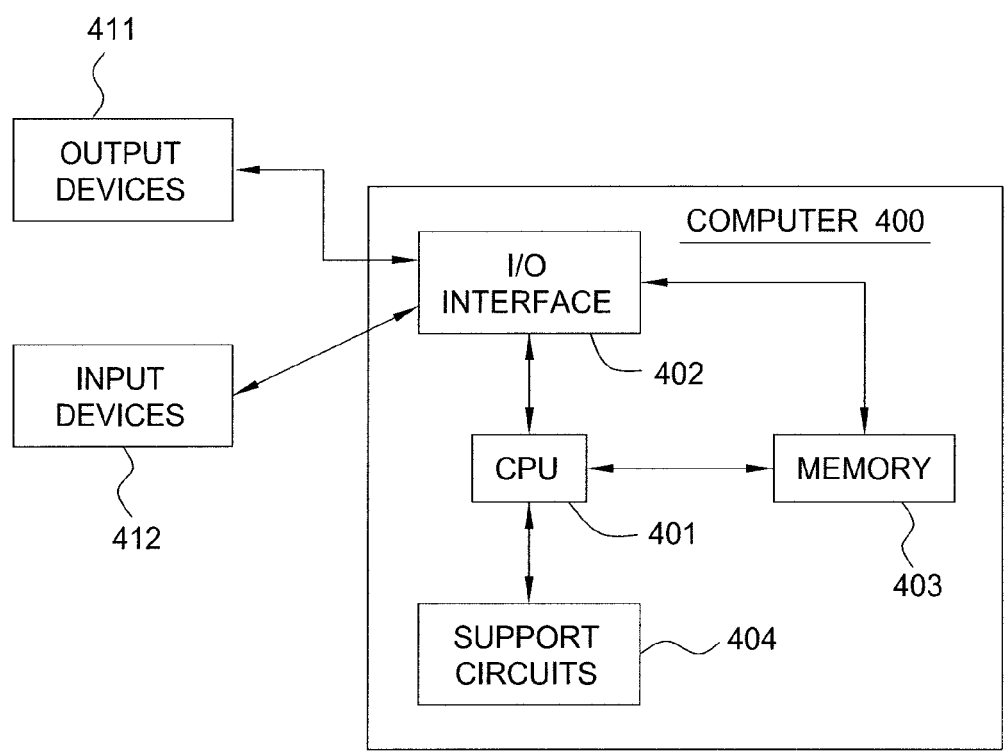
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of routing a call in a packet network, comprising:
    attempting, by a processor, to establish the call to a destination endpoint;
    detecting, by the processor, a failure condition for the destination endpoint for the call, wherein the detecting comprises:
        identifying an unavailability of the destination endpoint; and
        determining the unavailability of the destination endpoint between an error condition and a non-error condition based upon a failure to receive a busy/no answer message in response to a call setup message;
        wherein the failure condition is detected only in response to the unavailability of the destination endpoint due to the error condition;
    identifying, by the processor, an alternative endpoint address from an alternative routing plan registered with the packet network only in response to the failure condition due to the error condition, wherein the alternative endpoint address is not identified for the non-error condition, wherein the identifying of the alternative endpoint address comprises:
        notifying an application server coupled to a database for storing alternate routing plans for a plurality of endpoints; and
        receiving the alternative endpoint address from the application server that was obtained by the application server by querying the database in response to the notifying; and
    routing, by the processor, the call to the alternative endpoint address.

2. The method of claim 1, wherein the identifying of the alternative endpoint address further comprises:
    querying the database using the destination endpoint as an index value.

3. The method of claim 1, wherein the failure condition is detected by a network element in the packet network.

4. The method of claim 1, wherein the call is routed to the alternative endpoint address by a network element in the packet network.

5. The method of claim 1, wherein the packet network comprises a voice-over-internet protocol network.

6. An apparatus for routing a call in a packet network, comprising:
    a processor; and
    a non-transitory computer-readable medium storing a plurality of instructions which, when executed by the processor, cause the processor to perform operations, the operations comprising:

attempting to establish the call to a destination endpoint;
detecting a failure condition for the destination endpoint for the call, wherein the detecting comprises:
identifying an unavailability of the destination endpoint; and
determining the unavailability of the destination endpoint between an error condition and a non-error condition based upon a failure to receive a busy/no answer message in response to a call setup message;
wherein the failure condition is detected only in response to the unavailability of the destination endpoint due to the error condition;
identifying an alternative endpoint address from an alternative routing plan registered with the packet network only in response to the failure condition due to the error condition, wherein the alternative endpoint address is not identified for the non-error condition, wherein the identifying the alternative endpoint address comprises:
notifying an application server coupled to a database for storing alternate routing plans for a plurality of endpoints; and
receiving the alternative endpoint address from the application server that was obtained by the application server by querying the database in response to the notifying; and
routing the call to the alternative endpoint address.

7. The apparatus of claim 6, wherein the operations further comprise:
querying the database using the destination endpoint as an index value.

8. The apparatus of claim 6, wherein the detecting is performed by a network element in the packet network.

9. The apparatus of claim 6, wherein the routing is performed by a network element in the packet network.

10. The apparatus of claim 6, wherein the packet network comprises a voice-over-internet protocol network.

11. A non-transitory computer readable storage medium storing instructions which, when executed by a processor, cause the processor to perform operations of routing a call in a packet network, the operations comprising:
attempting to establish the call to a destination endpoint;
detecting a failure condition for the destination endpoint for the call, wherein the detecting comprises:
identifying an unavailability of the destination endpoint; and
determining the unavailability of the destination endpoint between an error condition and a non-error condition based upon a failure to receive a busy/no answer message in response to a call setup message;
wherein the failure condition is detected only in response to the unavailability of the destination endpoint due to the error condition;
identifying an alternative endpoint address from an alternative routing plan registered with the packet network only in response to the failure condition due to the error condition, wherein the alternative endpoint address is not identified for the non-error condition, wherein the identifying of the alternative endpoint address comprises:
notifying an application server coupled to a database for storing alternate routing plans for a plurality of endpoints; and
receiving the alternative endpoint address from the application server that was obtained by the application server by querying the database in response to the notifying; and
routing the call to the alternative endpoint address.

12. The non-transitory computer readable storage medium of claim 11, wherein the identifying of the alternative endpoint address further comprises:
querying the database using the destination endpoint as an index value.

13. The non-transitory computer readable storage medium of claim 11, wherein the packet network comprises an internet protocol network.

14. The non-transitory computer readable storage medium of claim 11, wherein the detecting, the identifying, and the routing are performed for each additional call.

15. The non-transitory computer readable storage medium of claim 13, wherein the packet network comprises a services-over-internet protocol network.

16. The non-transitory computer readable storage medium of claim 14, wherein the packet network comprises a voice-over-internet protocol network.

* * * * *